United States Patent [19]

Adam et al.

[11] 4,395,545

[45] Jul. 26, 1983

[54] BASIC DIOXAZINE COMPOUNDS

[76] Inventors: Jean-Marie Adam, 3, Rue de Montreux, 68300 Saint-Louis; Pierre Galafassi, 12, Rue des Sapins, 68170 Rixheim, both of France

[21] Appl. No.: 292,970

[22] Filed: Aug. 14, 1981

Related U.S. Application Data

[63] Continuation of Ser. No. 115,641, Jan. 28, 1980, abandoned.

[30] Foreign Application Priority Data

Feb. 2, 1979 [CH] Switzerland .................. 1042/79

[51] Int. Cl.$^3$ .................................. C07D 498/22
[52] U.S. Cl. .................................. 544/74; 8/454
[58] Field of Search .................................. 544/74

[56] References Cited

U.S. PATENT DOCUMENTS

| | | | |
|---|---|---|---|
| 2,066,915 | 1/1937 | Thiess et al. | 544/74 |
| 3,204,778 | 12/1966 | Randall et al. | 544/74 |

FOREIGN PATENT DOCUMENTS

| | | | |
|---|---|---|---|
| 702527 | 1/1965 | Canada | 544/74 |
| 2344781 | 3/1974 | Fed. Rep. of Germany | 544/74 |
| 917104 | 12/1960 | United Kingdom | 544/74 |

OTHER PUBLICATIONS

Chemical Abstracts, vol. 53, Cols. 21968–21969, (1950) Abstracting, Lantz et al., "Bull. Soc. Chim. France", (1959), pp. 510–513.
Chemical Abstracts, vol. 57, Cols. 12666–12668, (1962) Abstracting, Reichel et al., "Acad. Rep. Populare Romine, Studii Cercetari Chim.", vol. 9, pp. 521–532, (1961), Romania.
Chemical Abstracts, 7th Collective Index, vols. 56–64, subjects Chq–Dib, p. 7442 S (1969), Am. Chem. Soc.
Chemical Abstracts, 8th Collective Index, vols. 66–75, subjects Dibenzobr–Ethanola, p. 10079 S (1973), Am. Chem. Soc.
Venkataraman, "Chemistry of Synthetic Dyes", vol. II, pp. 781–791, (Academic Press, New York) (1952).

*Primary Examiner*—Robert T. Bond
*Attorney, Agent, or Firm*—Wenderoth, Lind & Ponack

[57] ABSTRACT

The invention discloses novel basic dioxazine compounds of the formula

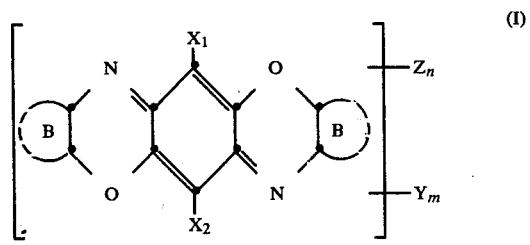

wherein each of $X_1$ and $X_2$ independently is an unbranched or branched alkyl group of 1 to 4 carbon atoms, an unsubstituted or substituted phenyl group, halogen, hydrogen, cyano, a phenylamino group which is unsubstituted or substituted in the phenyl nucleus, the $CONH_2$ group, the CONH-phenyl group which can be substituted in the phenyl moiety, or a COO—$C_1$-$C_4$ alkyl group; Z is a non-quaternized or quaternized basic group, Y is an anionic group, each B independently is a fused ring system containing 2 to 4 carbocyclic and/or heterocyclic rings and which, in addition to containing the substituents Z and Y, can be further substituted; n is 1 to 4 and m is 0 to 2, with the proviso that m is not greater than n. Processes for obtaining these compounds and their use as dyes for coloring and printing in particular cellulosic fabrics, without the addition of salt, are also disclosed.

10 Claims, No Drawings

BASIC DIOXAZINE COMPOUNDS

This is a continuation of application Ser. No. 115,641 filed on Jan. 28, 1980 (now abandoned).

The present invention relates to novel basic dioxazine compounds, processes for their production and their use as dyes for colouring and printing textiles, paper and leather, as well as for the preparation of inks.

The novel basic dioxazine compounds have the formula I

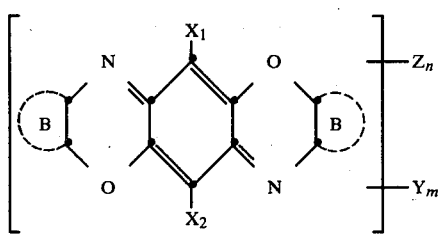

(I)

wherein each of $X_1$ and $X_2$ independently is an unbranched or branched alkyl group of 1 to 4 carbon atoms, an unsubstituted or substituted phenyl group, halogen, hydrogen, cyano, a phenylamino group which is unsubstituted or substituted in the phenyl nucleus, the $CONH_2$ group, the CONH-phenyl group which can be substituted in the phenyl moiety, or a $COO-C_1-C_4$ alkyl group; Z is a non-quaternised or quaternised basic group, Y is an anionic group, each B independently is a fused ring system containing 2 to 4 carbocyclic and/or heterocyclic rings and which, in addition to containing the substituents Z and Y, can be further substituted; n is 1 to 4 and m is 0 to 2, with the proviso that m is not greater than n.

$X_1$ and $X_2$ as unbranched or branched alkyl of 1 to 4 carbon atoms is e.g. methyl, ethyl, n-propyl, isopropyl and n-butyl, sec-butyl or tert-butyl. As unsubstituted or substituted phenyl, $X_1$ and $X_2$ are unsubstituted phenyl or phenyl which is substituted e.g. by branched and unbranched alkyl groups of 1 to 4 carbon atoms, alkoxy of 1 to 4 carbon atoms, such as methoxy and ethoxy, or halogen, such as fluorine, chlorine or bromine. Halogen represented by $X_1$ and $X_2$ is e.g. fluorine, chlorine or bromine. Where $X_1$ and $X_2$ are NH-phenyl or CONH-phenyl which is substituted in the phenyl moiety, possible substituents are branched and unbranched alkyl groups of 1 to 4 carbon atoms, alkoxy of 1 to 4 carbon atoms, such as methoxy and ethoxy, or halogen, such as fluorine, chlorine or bromine. COO-alkyl groups represented by $X_1$ and $X_2$ are e.g. the $COOCH_3$, $COOC_2H_5$ and $COOC_3H_7$(n- and iso) group.

In preferred dioxazine compounds, $X_1$ and $X_2$ are the same and each is in particular halogen, especially chlorine.

A fused ring system B containing 2 to 4 carbocyclic and/or heterocyclic rings is e.g. one of the following ring systems, wherein the position X indicates the linkage to the oxygen atom and the position Y the linkage to the nitrogen atom:

napthalene: 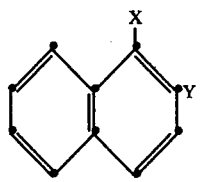

fluorene: 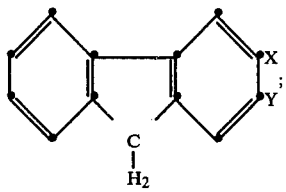

diphenylene oxide: 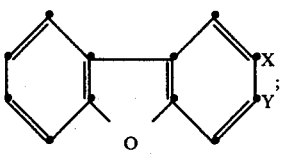

diphenylene sulfide: 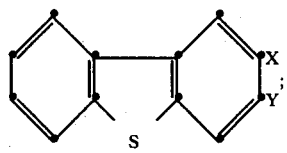

diphenylene dioxide: 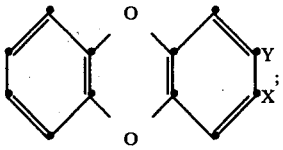

phenanthrene: 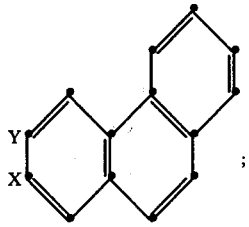

anthracene: 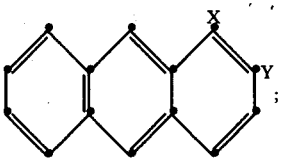

fluorenone: 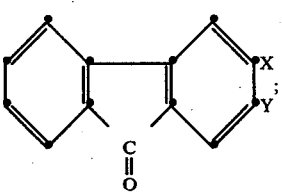

xanthone: 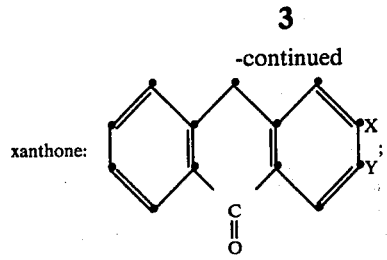

thioxanthone: 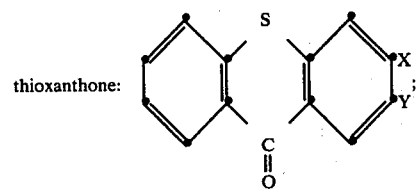

pyrene: 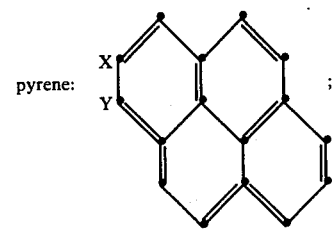

chrysene: 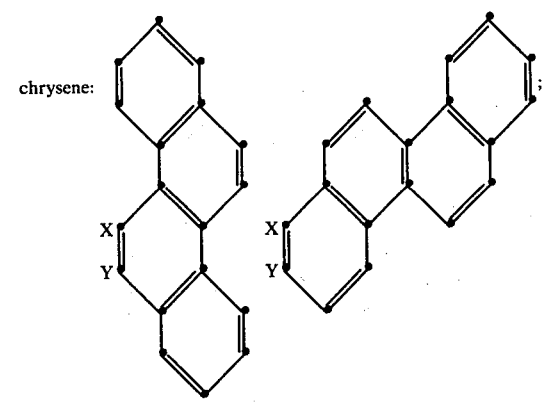

carbazole: 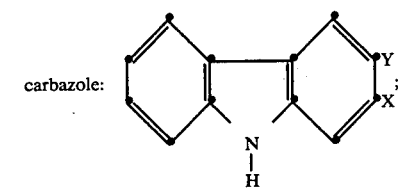

anthraquinone: 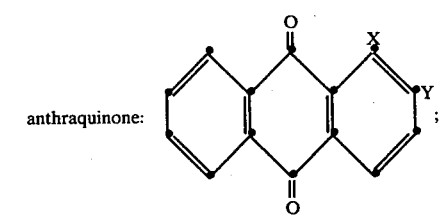

In addition to being substituted by Z and Y, all these ring systems B can be additionally further substituted by e.g. halogen, such as fluorine, chlorine or bromine, unbranched or branched alkyl groups of 1 to 4 carbon atoms, such as methyl, ethyl, n-propyl, iso-propyl, n-butyl, sec-butyl or tert-butyl; by alkoxy groups of 1 to 4 carbon atoms, such as methoxy, ethoxy, propoxy and butoxy; by the $NO_2$, CN, SCN, OH and SH group; and by the $SO_2NH_2$ group and $NH_2$ group which is mono- or disubstituted at the nitrogen atom.

In preferred dioxazine compounds, both symbols B have the same meaning and each is in particular: a fused carbazole ring system of the formula

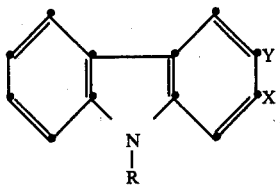

wherein R is hydrogen, an unbranched or branched alkyl group of 1 to 4 carbon atoms or an acyl group (e.g. $CO-C_1-C_4$ alkyl, CO-phenyl, $SO_2-C_1-C_4$ alkyl or $SO_2$-phenyl), and especially a carbazole ring system in which R is an unbranched or branched alkyl group of 1 to 4 carbon atoms, in particular the $C_2H_5$ group.

Z as a non-quaternised or quaternised basic group is e.g.:

(a) as a basic group, the radicals

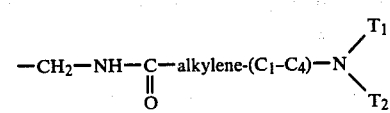

or

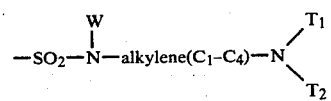

wherein $T_1$ is hydrogen or a low molecular alkyl radical which is unsubstituted or substituted e.g. by hydroxyl, or a cyclohexyl radical which is unsubstituted or substituted by 1 to 3 methyl groups, or is a phenyl radical; $T_2$ is a low molecular alkyl radical which is unsubstituted or substituted e.g. by hydroxyl, whilst $T_1$ and $T_2$ together with the nitrogen atom to which they are attached can form a pyrrolidine, piperidine, morpholine or piperazine ring; W is hydrogen, an unsubstituted alkyl group of 1 to 4 carbon atoms or an alkyl group of 1 to 4 carbon atoms which is substituted e.g. by hydroxyl or alkoxy of 1 to 4 carbon atoms.

Examples of

radicals are:

$-N-(CH_3)_2$
$-N-(C_2H_5)_2$
$-NH-CH_3$
$-NH-C_3H_7$

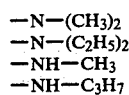

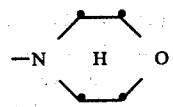

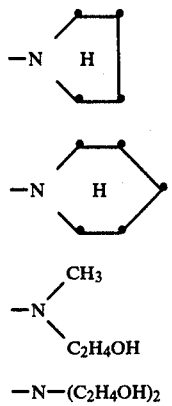

—N—(C₂H₄OH)₂

(b) as a quaternised group, e.g. the radical of the formula

—CH₂NH—CO-alkylene(C₁-C₄)—K⊕A⊖ wherein K⊕ is the radical,

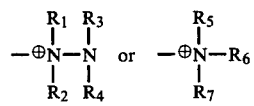

in which each of $R_1$ and $R_2$ independently is an unsubstituted or substituted alkyl group of 1 to 4 carbon atoms, or an unsubstituted or substituted cycloalkyl group, or together with the nitrogen atom to which they are attached can form a heterocyclic ring; each of $R_3$ and $R_4$ independently is hydrogen, an unsubstituted or substituted alkyl group of 1 to 4 carbon atoms, or an unsubstituted or substituted cycloalkyl group or an acyl group; $R_5$ is hydrogen, an alkyl group of 1 to 4 carbon atoms which is unsubstituted or substituted by OH or NH₂, an unsubstituted or substituted cycloalkyl group or an unsubstituted or substituted aryl group; each of $R_6$ and $R_7$ independently is hydrogen, an unsubstituted or substituted alkyl group of 1 to 4 carbon atoms, an unsubstituted or substituted cycloalkyl group, an unsubstituted or substituted alkoxy group of 1 to 4 carbon atoms, or an unsubstituted or substituted aryl group; or, together with the nitrogen atom to which they are attached, $R_1$ and $R_3$ and/or $R_2$ and $R_4$, or $R_5$ and $R_6$, or $R_5$, $R_6$ and $R_7$, form a heterocyclic ring, e.g. the unsubstituted or substituted pyridine ring, or the ring of the formula

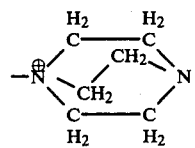

or Z is a quaternised radical of the formula

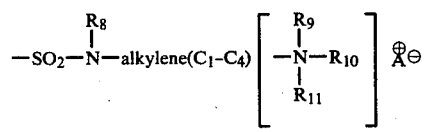

wherein $R_8$ is hydrogen or an alkyl group of 1 to 4 carbon atoms, each of $R_9$ and $R_{10}$ independently is an unsubstituted or substituted alkyl group of 1 to 4 carbon atoms or a cycloalkyl group, and $R_{11}$ is an unsubstituted or substituted alkyl group of 1 to 4 carbon atoms, a cycloalkyl group, an alkoxy group of 1 to 4 carbon atoms or the NH₂ group, or two or three members selected from $R_9$, $R_{10}$ and $R_{11}$ together with the nitrogen atom to which they are attached can form a heterocyclic ring; or Z is a radical of the formula

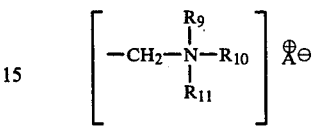

wherein $R_9$, $R_{10}$ and $R_{11}$ are as defined above and A is in all cases an anion.

Where Z is a quaternised basic group, suitable anions A are both inorganic and organic anions, e.g.: halogen, such as chloride, bromide or iodide, sulfate, methyl sulfate, aminosulfate, perchlorate, carbonate, bicarbonate, phosphate, phosphomolybdate, phosphotungstate, phosphotungstomolybdate, benzenesulfonate, naphthalenesulfonate, 4-chlorobenzensulfonate, oxalate, maleate, acetate, propionate, lactate, succinate, chloroacetate, tartrate, methanesulfonate or benzoate ions, or complex anions, such as those of zinc chloride double salts. Preferred anions are the chloride, acetate, zinc chloride or methyl sulfate ion.

In preferred dioxazine compounds of the formula I, Z is a quaternised basic group or a radical containing such a group, and n is 1 to 3.

Y as an anionic group is e.g. the phosphoric acid group, the carboxylic acid group or the sulfonic acid group, or a salt form such as the sodium, potassium, lithium or ammonium salt of this free acid group.

In preferred dioxazine compounds, m is 0, or Y is the SO₃H group or a salt form thereof.

Particularly interesting dioxazine compounds are those of the formula I, wherein each of $X_1$ and $X_2$ is chlorine, B is a fused ring system of the formula

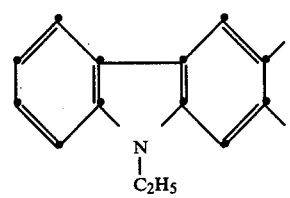

m is 0, n is 1 to 3, and Z is a quaternised basic group.

The non-quaternised or quaternised basic dioxazine compounds of the formula I are obtained in known manner. One possibility consists e.g. in (a) introducing a quaternisable basic group Z, or a radical containing such a group Z, into a compound of the formula II

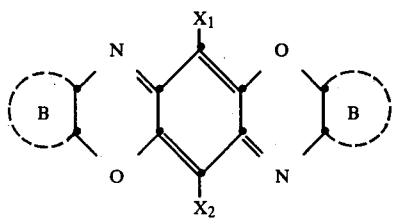

(II)

wherein B can be the same or different and $X_1$ and $X_2$ are as defined for formula I, which compound may or may not contain the radical Y, and then, if the radical Y is not yet present, introducing a water-solubilising group Y, and, if desired, quaternising the quaternisable basic group Z, or (b) condensing a compound of the formula III

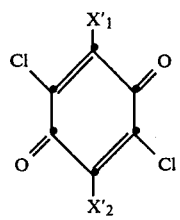

(III)

wherein $X_1'$ have the same meanings as $X_1$ and $X_2$ but are not CN, with at least a mole of a compound B—$NH_2$ and b mole of a compound B'—$NH_2$, the sum of a and b being at least 2 moles and B and B' can be the same or different, which compound contains a quaternisable basic group Z or an already quaternised basic group Z, with ring-closure, to produce a dioxazine compound, quaternising a quaternisable basic group which may be present, and, if desired, introducing the anionic group Y.

As regards process variant (a), the starting compounds of the formula II with and without an anionic group Y are known (e.g. U.S. Pat. Nos. 2,016,504; 2,082,344 and 2,026,092) and can be obtained in known manner. The introduction of a quaternisable basic group Z or the introduction of a group Z which contains a quaternisable group is likewise effected in known manner, e.g. by reacting the compound of the formula II with N-methylolchloroacetamide in concentrated $H_2SO_4$ or phosphoric acid, if desired in the presence of $P_2O_5$, and 0° to 5° C., preferably at room temperature, and then aminating e.g. with pyridine, or by introducing first the $SO_2Cl$ group into the compound of the formula II in conventional manner (e.g. with chlorosulfonic acid at 100°–150° C.), then aminating with a diamine, or by introducing the —$CH_2Cl$ group in the presence of dichloromethyl ether/$H_2SO_4$ at 50°–60° C., or in $H_2SO_4$/chlorosulfonic acid and paraformaldehyde at 50°–60° C., into the compound of the formula II, and then aminating.

Suitable quaternisable basic groups Z are all basic groups which are capable of taking up protons during the dyeing process in order to be converted into cationic groups. Examples of such compounds into which a basic quaternisable group Z is to be introduced, are the basic groups mentioned in the definition of Z containing a N-methylol grouping and the amines NH.W-alkylene ..., which are then further reacted with the sulfochloride.

If it is desired to convert the quaternisable basic group Z in the compound of the formula II into a quaternised compound, the quaternisation is also carried out in known manner, e.g. in an inert solvent, such as chlorobenzene, or, if desired, in an aqueous suspension, or without a solvent in an excess of the quaternising agent, in the temperature range from about 20° to 120° C.

Examples of suitable quaternising agents are: alkyl halides, such as methyl or ethyl chloride, methyl, ethyl or butyl bromide, or methyl or ethyl iodide, alkyl sulfates, such as dimethyl, diethyl and dibutyl sulfate, benzyl chloride, chloroacetamide, acrylates, epoxides, such as ethylene oxide, epichlorohydrin, and alkyl esters of aromatic sulfonic acids, such as methyl-p-toluenesulfonate, methylbenzenesulfonate, as well as the propyl and butyl esters of benzenesulfonic acid.

If the compounds of the formula II do not contain an anionic group Y, then these groups Y can advantageously be introduced, before the quaternisation of the quaternisable group, into a quaternised group Z. This is accomplished e.g. by sulfonization with sulfuric acid or, if a phosphoric acid group is introduced, by proceeding in accordance with the method of U.S. Pat. No. 2,845,420.

After the possible quaternisation and introduction of the water-solubilizing group Y, the dioxazine compounds of the formula I are separated from the reaction medium and dried.

As regards process (b), the starting material is the compound of the formula III which is condensed with a mole of B—$NH_2$ and b mole of B'—$NH_2$, with ring-closure, in a manner known per se (K. Venkataraman, Vol. II (1952), p. 786, "The Chemistry of Synthetic Dyes", N.Y.). If it is desired that the final compounds of the formula I should contain a CN group at the positions $X_1$ and $X_2$, such compounds are produced by condensing a compound of the formula IIIa

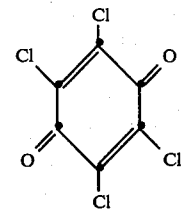

IIIa with a mole of B—$NH_2$ and b mole of B'—$NH_2$, with ring-closure, as described above, and then replacing the two chlorine atoms at the positions $X_1$ and $X_2$ by CN, e.g. by reaction with copper cyanide.

If the amines B—$NH_2$ and B'—$NH_2$ contain a quaternisable basic group Z, then this latter can be converted as described above into a quaternised compound. If desired, an anionic group Y is additionally introduced as described above.

By means of these procedures it is possible to obtain dioxazine compounds of the formula I in which both symbols B are the same or different. In addition, it is also possible to obtain mixtures which contain dioxazine compounds of the formula I in which both symbols B are the same, and dioxazine compounds of the formula I in which the symbols B are different.

The novel basic non-quaternised or quaternised dioxazine compounds of the formula I are employed as dyes for dyeing and printing textiles, leather and paper and also for the preparation of inks.

Suitable textiles for dyeing and printing with these dyes are: natural and regenerated cellulosic fabrics, especially cotton and viscose, on which fabrics brilliant red, turquoise blue and navy blue dyeings are obtained; wool and silk, and acid-modified polyamide material, as well as acrylic fibres, especially wet tow and modified polyester material which can be dyed with basic dyes. The dioxazine compounds of the formula I have good affinity for these textiles, especially on cellulosic fabrics, a good degree of exhaustion, and the dyeings obtained have very good fastness properties, in particular wetfastness properties, such as fastness to water, water/alcohol, and especially light. With basic dyes it is possible to improve the wetfastness properties still further by "insolubilising", e.g. by subjecting the dye molecule on the fibre to an aftertreatment with alkali. It is furthermore advantageous that the dioxazine compounds of the formula I exhaust onto the cellulose material without subjecting the material to a pretreatment and without the addition of salt to the dyebath.

A further utility of the dioxazine compounds of the formula I is for colouring paper of all kinds, especially of bleached, unsized and sized lignin-free paper. These compounds are most suitable for colouring unsized paper (tissues) on account of their very high standard affinity for this substrate.

The compounds of the invention exhaust very well onto these substrates, while the wastewaters remain virtually colourless even in the production of deep shades (up to 1/1 reference type strength). This is a prime ecological advantage, especially in view of present wastewater legislation. In contrast to the conventional anionic direct dyes, the degree of exhaustion is hardly influenced at all by the water hardness.

The dyeings are wetfast, i.e. they show no tendency to bleeding when coloured paper in the wet state is brought into contact with moist white paper. This is an especially desirable property for tissues, with which it is to be expected that the coloured paper in the wet state (e.g. soaked with water, alcohol, surfactant solution etc.) will come into contact with other surfaces, such as textiles, paper and the like, which have to be protected against soiling.

The high affinity for paper and the high rate of exhaustion of the dioxazine dyes of this invention is most advantageous for the continuous coloration of paper and thus makes possible a much broader use of this economic process, which has the following advantages:

(a) a simpler and more rapid correction of the shade and therefore less loss of non-standard paper (broke) in comparison with the batchwise colouring of pulp;

(b) a better constancy of shade; and (c) when the dye is added shortly before the stock preparation in the dilute paper pulp, a thorough cleansing of the hollander, mixing chest etc., after each batch is no longer necessary, while at the same time the operation is shortened and the process optimised.

Further, the dioxazine compounds are used for dyeing leather material by a very wide variety of application methods, such as spraying, brushing and immersing, and for the preparation of inks, especially for ballpoint pens.

Finally, the novel dioxazine compounds of the formula I are used for the mass colouration of synthetic linear polyamides, such as polyhexamethylene-adipamide. The colouration of the polyamide chips is effected in particular from an aqueous bath in the presence of wetting or dispersing agents and optionally salts, and by subsequent melting and forming.

In view of the reducible properties of the fused polyamide melts and the high melt temperature (about 270°–300° C.), the use of these dyes of the formula I constitutes a surprising enlargement of the stock of technical knowledge.

The following examples illustrate the invention without implying any restriction to what is described therein. Parts and percentages are by weight.

EXAMPLE 1

A mixture of 59 parts of the compound of the formula

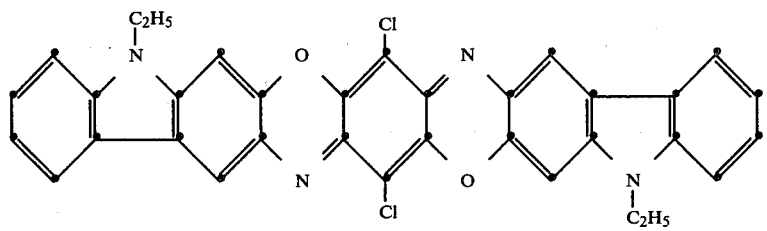

and 25 parts of N-methylolchloroacetamide are dissolved at 0°–5° C. in 500 parts of 98% sulfuric acid. The mixture is then stirred for 15 hours at room temperature. The solution is poured on ice, whereupon the reaction product precipitates. The precipitate is then collected by filtration and washed neutral with water and dried, affording 77 parts of the compound of the formula

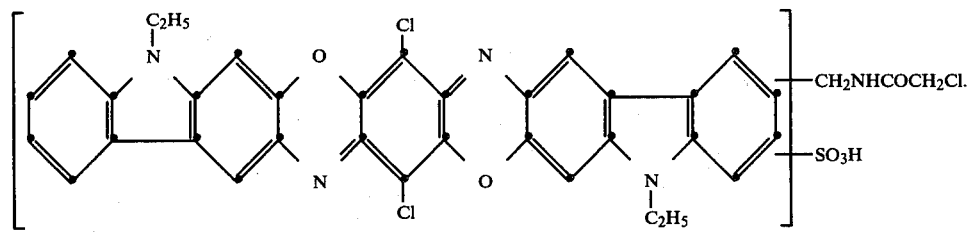

30 parts of the above compound are added to 200 parts of pyridine and the mixture is heated for 1 hour to 100° C. The precipitated compound of the formula

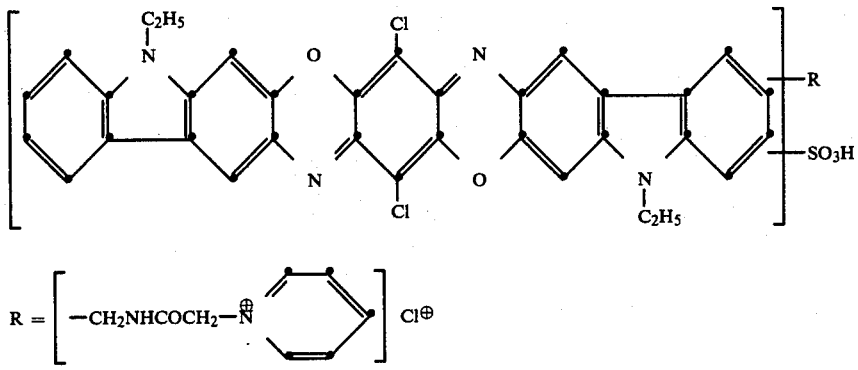

is filtered with suction and dried.

A compound of the formula

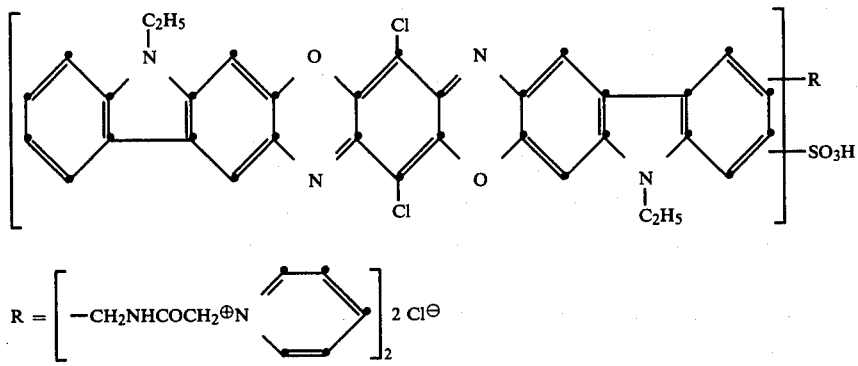

is obtained by using in this Example 38 parts of N-methylolchloroacetamide instead of 25 parts, reacting the mixture for 15 hours at 0°–5° C., then quaternising with pyridine.

EXAMPLE 2

A mixture of 59 parts of the compound of the formula

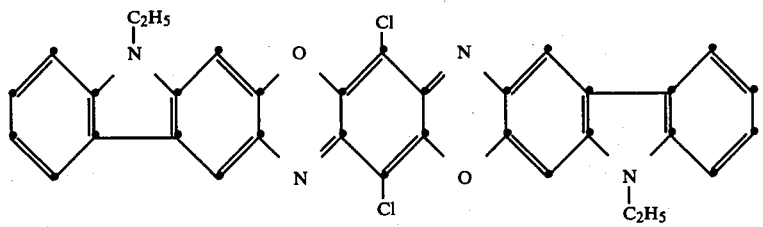

(condensation product of chloroanil with 3-amino-N-ethylcarbazole) and 38 parts of N-methylolchloroacetamide is added at 0°–5° C. to 500 parts of 90% sulfuric acid, and the reaction mixture is stirred for 15 hours at 0°–5° C. The reaction product is precipitated by pouring the mixture on ice, filtered with suction, washed neutral with water and dried, affording 90 parts of the compound of the formula

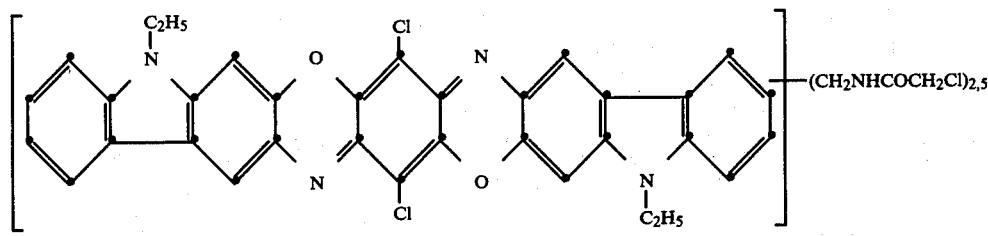

30 parts of this compound are reacted with pyridine in accordance with Example 1. The isolated cationic compound of the formula

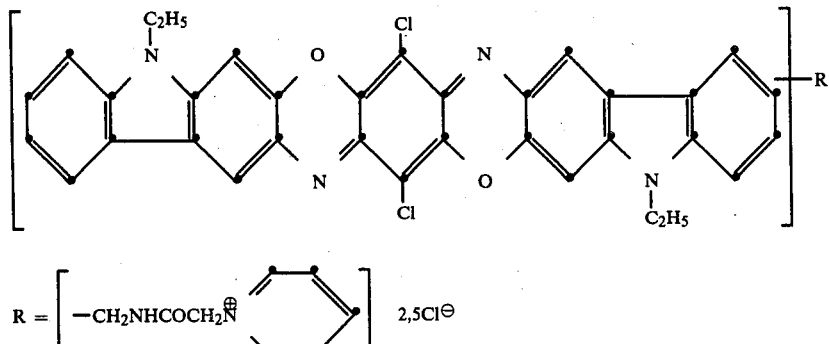

has very good affinity for paper and cotton. The neutral blue dyeings have very good wetfastness properties and very good lightfastness.

Similar dyes having equally good properties are obtained by repeating the procedure of this Example, but replacing pyridine by α-picoline, γ-picoline, or a mixture of α- and γ-picoline, or by 3-hydroxypyridine, triethylenediamine or trimethylamine.

The cationic dioxazine compounds listed in column IV of Table 1 which produce the shades on cotton indicated in column V, are obtained by repeating the procedure of this Example 1, but using equivalent amounts of the condensation products listed in column II instead of the 59 parts of the condensation product of chloroanil with 3-amino-N-ethylcarbazole, reacting these products with the indicated parts of N-methylol compound, and aminating with pyridine.

TABLE I

| Example | Condensation product | N—methylol compound N—methylol-chloroacetamide | | Shade on cotton |
|---|---|---|---|---|
| | II | III | IV | V |
| 3 | [dioxazine structure with C₂H₅ groups, Cl, O, N] | 19 parts | [product structure with CH₂NHCOCH₂N⁺-pyridinium, Cl⁻₁,₃] A = 2Cl⁻ | blue |
| 4 | [dioxazine structure with C₂H₅ groups] | 25 parts | [product structure with pyridinium, A] | blue |
| 5 | [dioxazine structure with N—H] | 25 parts | [product structure with N—H, pyridinium, A] | reddish blue |
| 6 | [dioxazine structure with COCH₃] | 25 parts | [product structure with COCH₃, pyridinium, A] | bluish violet |

TABLE I-continued

| I Example | II Condensation product | III N—methylol compound N—methylol-chloroacetamide | IV A = 2Cl⊖ | V Shade on cotton |
|---|---|---|---|---|
| 7 | [structure] | 25 parts | [structure] | violet |
| 8 | [structure] | 25 parts | [structure] | reddish violet |
| 9 | [structure] | 25 parts | [structure] | bluish violet |
| 10 | [structure] | 25 parts | [structure] | bluish violet |

EXAMPLE 11

59 parts of the condensation product of chloroanil

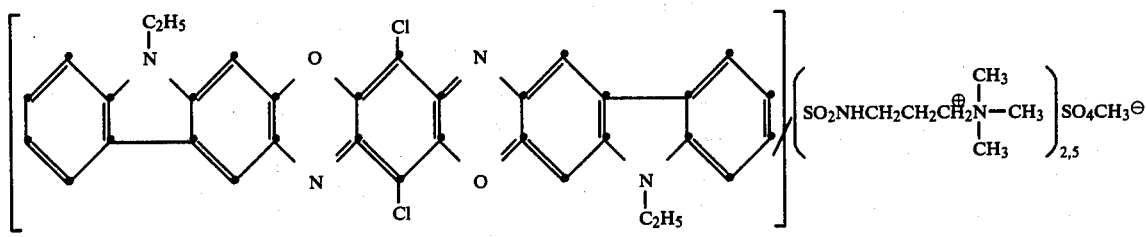

with 3-amino-N-ethylcarbazole are heated for 4 hours to 130° C. in 350 parts of chlorosulfonic acid with 20 parts of phosphorus pentachloride. The reaction mixture is then poured on ice and the precipitated dioxazine sulfochloride is filtered with suction and washed neutral with water. The isolated, dried sulfochloride is added at 25°–30° C. to a mixture of 150 parts of 3-dimethylamino-1-propylamine and 150 parts of pyridine. The compound of the formula

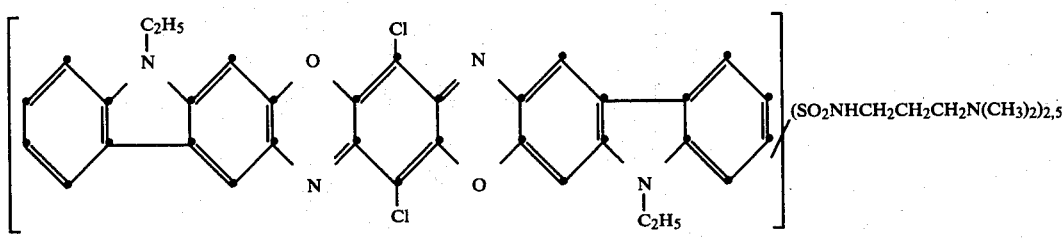

precipitates and is isolated by filtration.

The quaternisation is carried out by heating with dimethyl sulfate in dichlorobenzene at 50°–60° C., affording the compound of the formula which dyes cotton in a neutral blue shade of good light- and wet-fastness.

A similar dye having the same good dyeing properties is obtained by quaternising with ethylene chlorohydrin instead of with dimethyl sulfate.

The cationic compounds listed in column III of Table 2 which dye cotton in the shades indicated in column IV are obtained by repeating the procedure of this Example, but using the condensation products listed in column II instead of the condensation product of chloroanil with 3-amino-N-ethylcarbazole.

TABLE II

| I | II | III | IV |
|---|---|---|---|
| Example | Condensation product | Cationic compound B = 2-3 $SO_4CH_3^{\ominus}$ | Shade on cotton |
| 12 | (dioxazine structure with naphthalene groups) | [dioxazine]—$(SO_2NH(CH_2)_3\overset{\oplus}{N}(CH_3)_3)_{2\text{-}3}B$ | violet |
| 13 | (dioxazine structure with pyrene groups) | [dioxazine]—$(SO_2NH(CH_2)_3\overset{\oplus}{N}(CH_3)_3)_{2\text{-}3}B$ | blue |
| 14 | (dioxazine structure with phenanthrene groups) | [dioxazine]—$(SO_2NH(CH_2)_3\overset{\oplus}{N}(CH_3)_3)_{2\text{-}3}B$ | greenish blue |
| 15 | (dioxazine with CH$_2$-phenyl bridges) | [dioxazine with CH$_2$-phenyl bridges]—$(SO_2NH(CH_2)_3\overset{\oplus}{N}(CH_3)_3)_2 \, 2SO_4CH_3^{\ominus}$ | violet |

TABLE II-continued

| Example | Condensation product | Cationic compound B = 2-3 SO₄CH₃⁻ | Shade on cotton |
|---|---|---|---|
| 16 | [structure] | [structure with $(SO_2NH(CH_2)_3\overset{\oplus}{N}(CH_3)_3)_{2-3}B$] | greenish blue |
| 17 | [structure] | [structure with $(SO_2NH(CH_2)_3\overset{\oplus}{N}(CH_3)_3)_{2-3}B$] | bluish violet |

EXAMPLE 18

In a beam dyeing machine, 10 parts of bleached mercerised cotton fabric are dyed in an aqueous liquor containing 0.08 part of the dye of Example 2 and without the addition of salt (liquor ratio 1:25; water hardness 10°dH; pH 6; circulation speed of the liquor: 3 revolutions/min).

The dyebath is heated linearly from 40° to 80° C. in the course of 60 minutes and the cotton is dyed in a strong, clear, brilliant blue shade. The dyeing has very good lightfastness and an unexpectedly good wetfastness which can usually only be obtained with reactive and vat dyes.

EXAMPLE 19

Cotton fabric dyed in a strong, clear, brilliant blue shade of a more reddish cast is obtained by using equal parts of the dye of Example 1 instead of that of Example 2. The general fastness properties of the dyeing are as good as those of Example 18.

EXAMPLE 20

Instead of using the cationic dye of Example 2, cotton fabric is dyed with an equal molar amount of an analogous known anionic dye of the formula

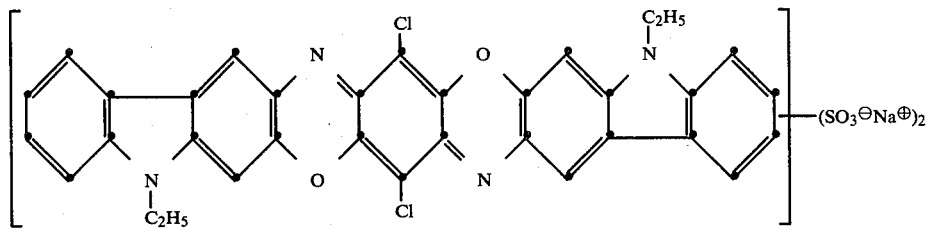

(U.S. Pat. No. 2,026,092). The cotton is dyed in a bright blue shade, but the degree of exhaustion is barely 5%. The wetfastness of the dyeing is comparable with that of a conventional direct dye, i.e. substantially lower than that obtained with the analogous cationic dye of the invention.

EXAMPLE 21

The procedure of Example 20 is repeated, except that 30 g/l of sodium chloride are added to the dyebath in 6 portions (at intervals of 10 minutes). The cotton fabric is dyed in a somewhat lighter shade of blue than in Example 18 and 19 (degree of exhaustion about 75%). In addition, the wetfastness of the dyeing is much poorer than that usually obtained with an anionic direct dye.

EXAMPLE 22

5 parts of paper (unsized, 50% sulfite RKN 15 bleached and 50% beach sulfite unbleached, Schopper-Riegler freeness 21°) are suspended in 200 parts of water (hardness 10°dH, pH 6) in a stainless steel vessel. Then 0.1 part of the dye of Example 3 is added. After stirring for 20 minutes at 22° C. a further 1800 parts of water are added. A sheet of paper is then produced in a Frank sheet former. The sheet of paper is coloured a deep blue shade of good lightfastness and is resistant to leaching by water, water/alcohol (50:50), milk and surfactant solutions, whilst the wastewater is colourless. (Degree of exhaustion: more than 99%).

EXAMPLE 23

A sheet of paper is produced as in Example 22, except that 0.1 part of the known anionic dye of Example 20 is employed. In comparison with Example 22, the paper is coloured in a substantially lighter blue shade and the wastewater is coloured deep blue. The degree of exhaustion is hardly 42%. The resistance to leaching by water is much lower than that obtained with the analogous cationic dye of Example 3.

EXAMPLE 24

A sheet of paper is produced and coloured as in Example 22, except that soft water is used (1°dH). No difference in the colour strength, fastness properties and in the quality of the wastewater can be observed.

EXAMPLE 25

A sheet of paper is produced and coloured as in Example 22, except that 3% (based on the pulp) of a 10% aqueous solution of a commercially available wet strength agent (polyamide amine) is added to the bath simultaneously with the dye. No difference in the fastness properties of the coloured paper and in the quality of the wastewater can be observed.

EXAMPLE 26

An aqueous solution of the dye of Example 2 is added continuously by means of a metering pump to a flowing aqueous suspension of pulp in a continuously operating laboratory paper machine. The machine produces 25 g/min of a paper consisting of unsized pulp (50% sulfite RKN 15 bleached and 50% beach sulfite unbleached). The concentration of dye solution is 1 g/l and 25 ml of this solution are added per minute. The conditions prevailing at the site of addition are: pH 6, water hardness 10°dH, temperature 23° C., liquor ratio 1:400. The time between addition and stock preparation is only 4 seconds. The paper obtained is coloured in a level, light blue shade. It is lightfast and resistant to leaching by water, water/alcohol, milk and surfactant solutions. Despite the very short dyeing time, the wastewater is colourless.

EXAMPLE 27

A sheet of paper is produced and coloured as in Example 22, except that, instead of sulfite, 5 parts of a bleached sulfate paper is used (Stora 32, bleached, SR freeness 30°). The paper is coloured a deep blue shade, has very good lightfastness and is resistant to leaching by water/alcohol (50:50), milk and surfactant solutions. The wastewater is colourless.

What is claimed is:
1. A dioxazine compound of the formula I

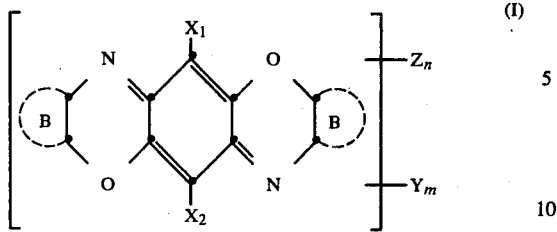 (I)

wherein
each of $X_1$ and $X_2$ is chlorine;
each B independently is a fused ring system selected from the group consisting of naphthalene, fluorene, diphenylene oxide, diphenylene sulfide, disphenylene dioxide, phenanthrene, anthracene, fluorenone, xanthone, thioxanthone, pyrene, chrysene, carbazole and anthraquinone, each of which, in addition to the substituents Z and Y, can be further substituted by 1 or more unbranched or branched alkyl of 1-4 carbons or acyl selected from the group consisting of $CO-C_1-C_4$ alkyl, CO-phenyl, $SO_2-C_1-C_4$ alkyl and $SO_2$-phenyl;
Y is a phosphoric acid group, carboxylic acid group or sulfonic acid group, or a salt thereof;
Z is
(1) a non-quaternised basic group selected from the group consisting of

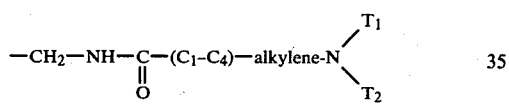

and

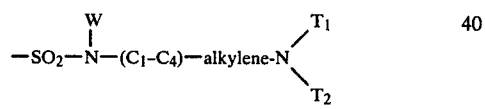

wherein
$T_1$ is hydrogen, low molecular alkyl which is unsubstituted or substituted by hydroxyl, cyclohexyl which is unsubstituted or substituted by 1-3 methyl groups or phenyl,
$T_2$ is low molecular alkyl which is unsubstituted or substituted by hydroxyl, or $T_1$ or $T_2$ together with the nitrogen atom to which they are attached form a pyrrolidine, piperidine, morpholine or piperazine ring,
W is hydrogen or alkyl or 1 to 4 carbons which is unsubstituted or substituted by hydroxyl or $C_1-C_4$ alkoxy; or
(2) a quaternised basic group selected from the group consisting of

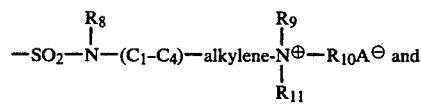

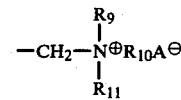

wherein
$K^\oplus$ is

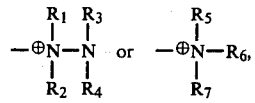

each of $R_1$ and $R_2$ independently is an alkyl group of 1 to 4 carbons, cycloalkyl or together with the nitrogen atom to which they are attached form a heterocyclic ring selected from the group of pyridine and triethylenediamine, each of $R_3$ and $R_4$ independently is hydrogen, an alkyl group of 1 to 4 carbons, cycloalkyl or an acyl group of the formula $CO-C_1-C_4$ alkyl, CO-phenyl, $SO_2-C_1-C_4$ alkyl or $SO_2$-phenyl, $R_5$ is (1) hydrogen, (2) an alkyl group of 1 to 4 carbons which is unsubstituted or substituted by OH or $NH_2$, (3) cycloalkyl or (4) phenyl, each of $R_6$ and $R_7$ independently is hydrogen, an alkyl group of 1 to 4 carbons, cycloalkyl, an alkoxy group of 1 to 4 carbons or phenyl, or together with the nitrogen atom to which they are attached, $R_1$ and $R_3$, $R_2$ and $R_4$, $R_5$ and $R_6$ or $R_5$, $R_6$ and $R_7$, form a heterocyclic ring selected from the group of pyridine and triethylenediamine, $R_8$ is hydrogen or an alkyl group of 1 to 4 carbons, each of $R_9$ and $R_{10}$ independently is an alkyl group of 1 to 4 carbons or cycloalkyl, and $R_{11}$ is an alkyl group of 1 to 4 carbons, cycloalkyl, an alkoxy group of 1 to 4 carbons or $NH_2$, or 2 or 3 members selected from $R_9$, $R_{10}$ and $R_{11}$ together with the nitrogen atom to which they are attached form a heterocyclic ring selected from the group of pyridine and triethylenediamine;
$A^\ominus$ is an anion;
m is 0 to 2; and
n is 1 to 4 with the proviso that m is not greater than n.

2. A dioxane compound according to claim 1, wherein each B is a fused carbazole ring system of the formula

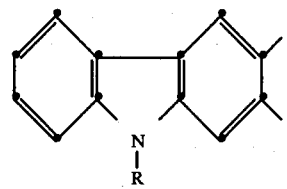

wherein R is hydrogen, an unbranched or branched alkyl group of 1 to 4 carbon atoms, or an acyl group of the formula $CO-C_1-C_4$ alkyl, CO-phenyl, $SO_2-C_1-C_4$ alkyl or $SO_2$-phenyl.

3. A dioxazine compound according to claim 2, wherein each B is a fused ring system of the formula

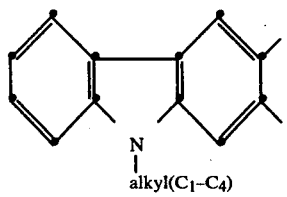

4. A dioxazine compound according to claim 3, wherein said alkyl ($C_1$-$C_4$) is $C_2H_5$.

5. A dioxazine compound according to claim 1, wherein z is a quaternized basic group or contains such a group.

6. A dioxazine compound according to claim 1, wherein n is 1 to 3.

7. A basic dioxazine compound according to claim 1, wherein m is 0.

8. A dioxazine compound according to claim 1, wherein Z is a quaternized group or a radical which contains such a group, wherein the anion A is Cl, $CH_3COO$, $ZnCl_3$, or $CH_3SO_4$.

9. A dioxazine compound according to claim 1, wherein each of $X_1$ and $X_2$ is chlorine, B is a fused ring system of the formula

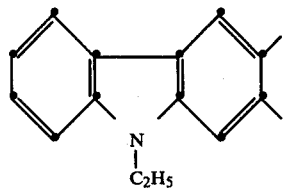

m is 0, n is 1 to 3, and Z is a quaternized group.

10. A process for the production of a dioxazine compound of the formula I according to claim 1, which comprises (a) introducing a quaternizable basic group Z, or a radical containing such a group Z, into a compound of the formula II

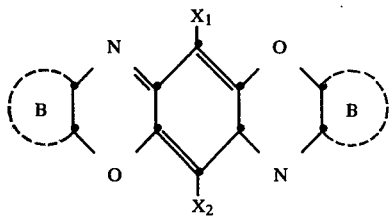

wherein B can be the same or different and $X_1$ and $X_2$ are as defined for formula I, which compound may or may not contain the radical Y, and then, if the radical Y is not yet present, introducing a water-solubilizing group Y, and, if desired, quaternizing the quaternizable basic group Z or (b) condensing a compound of the formula III

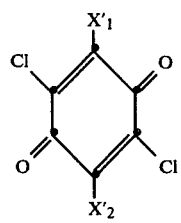

wherein $X_1'$ and $X_2'$ have the same meanings as $X_1$ and $X_2$ but are not CN, with at least a mole of a compound B—$NH_2$ and b moles of a compound B'—$NH_2$, the sum of a and b being at least 2 moles, and B and B' can be the same or different, which compound contains a quaternizable basic group Z or an already quaternized basic group Z, with ring-closure, to produce a dioxazine compound, quaternizing a quaternizable basic group Z which may be present and, if desired, introducing the water-solubilizing group Y, or, if $X_1$ and $X_2$ in the final product of formula I are CN, condensing a compound of the formula IIIa

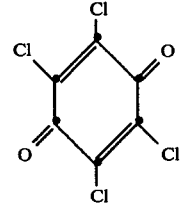

with a mole of B—$NH_2$ and b moles of B'-$NH_2$, with ring-closure, and subsequently replacing both chlorine atoms at the positions of $X_1$ and $X_2$ by CN.

* * * * *